United States Patent Office 2,759,963
Patented Aug. 21, 1956

2,759,963
SUBSTITUTED BENZOATES

Etcyl H. Blair, Midland, Mich., assignor to The Dow Chemical Company, Midland, Mich., a corporation of Delaware No Drawing. Application May 19, 1954,
Serial No. 430,994

6 Claims. (Cl. 260—465)

The present invention is concerned with substituted benzoates having the formula

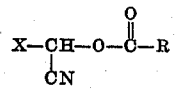

wherein X represents a halomethyl radical and R represents a halophenyl or nitrophenyl radical. These new ester compounds are crystalline solids or viscous liquids somewhat soluble in many common organic solvents and of very low solubility in water. The compounds are particularly useful as bactericides and fungicides and are adapted to be employed as active toxic constituents of compositions for the control of many common bacterial and fungal organisms such as *Staphylococcus aureus* and *Alternia solani*.

The new substituted benzoate compounds may be prepared by mixing or otherwise blending together a haloacetaldehyde cyanohydrin and a halobenzoyl halide or nitrobenzoyl halide at a reaction temperature at which a halide of reaction is formed from the carbonyl halogen of the substituted benzoyl halide reactant. This halide appears in the reaction mixture as hydrogen halide and may be neutralized, if desired. The reaction conveniently may be carried out in an inert solvent such as toluene, chlorobenzene or dichlorobenzene. The amounts of the reactants to be employed are not critical, some of the desired product being produced with any proportion of ingredients. In general, optimum yields are obtained when employing substantially equimolecular proportions of the reagents.

The reaction proceeds smoothly with the formation of the desired product and hydrogen halide of reaction at temperatures of from 100° to 210° C. depending upon whether the substituted benzoyl halide reactant is a halobenzoyl halide or nitrobenzoyl halide. The reaction between the nitrobenzoyl halide and haloacetaldehyde cyanohydrin takes place smoothly at temperatures of from 150° to 210° C. with the formation of the nitrobenzoate derivative. Where it is desired to prepare the halobenzoate derivatives, the reaction between the halobenzoyl halides and haloacetaldehyde cyanohydrins is carried out and proceeds smoothly at temperatures of from 100° to 210° C. In carrying out the reaction, substantially all of the carbonyl halogen of the substituted benzoyl halide reactant may be recovered as hydrogen halide. Upon completion of the reaction, the desired product may be separated by conventional methods, e. g. extraction with an organic solvent, washing with water, washing with dilute aqueous alkali metal carbonate, filtration, decantation and evaporation of any employed reaction solvent.

The haloacetaldehyde cyanohydrins, employed as starting materials in the aforedescribed process, may be prepared by reacting together (1) a haloacetaldehyde or its hydrate, where available, (2) an alkali metal cyanide and (3) water. The reaction conveniently may be carried out in water or an inert organic solvent and takes place readily at temperatures of from −25° to 15° C.

Good results are obtained when substantially equimolecular proportions of the reactants are employed. Following the reaction, the desired haloacetaldehyde cyanohydrin may be separated by conventional methods.

In preparing the benzoate derivatives of the present invention, it has been found unnecessary to isolate the haloacetaldehyde cyanohydrin to be employed as a starting material. Thus, the process for preparing the novel benzoates may be carried out by mixing or otherwise blending together (1) a haloacetaldehyde or its hydrate (2) an alkali metal cyanide, (3) a halobenzoyl or nitrobenzoyl halide and (4) water at a temperature at which a halide of reaction is formed from the carbonyl halogen of the substituted benzoyl halide reactant. This halide of reaction appears in the reaction mixture as alkali metal halide from the alkali metal of the alkali metal cyanide. The reaction is very exothermic and proceeds smoothly with the formation of the desired product and alkali metal halide of reaction at temperatures of from −25° to 15° C. The temperature may be controlled by regulating the rate of contacting the reactants and/or by the addition and subtraction of heat, as required. The reaction conveniently may be carried out in water or an inert organic solvent as reaction medium. Good results are obtained when substantially equimolecular proportions of the reagents are employed. In carrying out the reaction, the reactants may be combined in any convenient fashion. In a preferred method of operation, an aqueous solution of the alkali metal cyanide is added to a mixture of the substituted benzoyl chloride and haloacetaldehyde or its hydrate under suitable conditions of temperature in the reaction vessel. Upon completion of the reaction, the desired product may be separated as previously described.

The following examples illustrate the invention but are not to be construed as limiting:

*Example 1.—2,2,2-trichloro-1-cyanoethyl
4-chlorobenzoate*

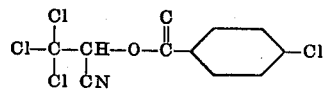

One-half mole (82.7 grams) of chloral hydrate and 0.5 mole (24.5 grams) of sodium cyanide were dispersed in 75 milliliters (4.1 moles) of water and 0.5 mole (87.5 grams) of 4-chlorobenzoyl chloride added portionwise thereto over a period of three hours. The addition was carried out with stirring and at a temperature of from 0° to 5° C. Following the addition, the reaction mixture was set aside at 5° C. for 16 hours. The cold mixture was then filtered to separate a 2,2,2-trichloro-1-cyanoethyl 4-chlorobenzoate product as a crystalline residue. The latter was twice recrystallized from ethanol and found to melt at 100°–101° C. and have a chlorine content of 45.18 percent and a nitrogen content of 4.44 percent.

*Example 2.—2,2,2-trichloro-1-cyanoethyl
4-chlorobenzoate*

Two moles (330.8 grams) of chloral hydrate was dispersed in 1600 milliliters of chloroform and 2 moles (350 grams) of p-chlorobenzoyl chloride added portionwise thereto with stirring. The addition was carried out over a period of 15 minutes and at a temperature of −10° C. Following the addition, 110 grams (2.24 moles) of sodium cyanide dispersed in 110 milliliters of water was added portionwise with stirring and over a period of one hour. The addition was carried out at a temperature of from −10° to −20° C. and the reaction mixture thereafter stirred for one hour at a temperature below 0° C. to complete the reaction. The mixture was then warmed to room temperature, the aqueous layer separated from the organic layer and the latter successively washed with 5 percent aqueous sodium carbonate and water. The solvent was then removed by evaporation to obtain a 2,2,2-trichloro-1-cyanoethyl 4-chlorobenzoate product as a crystalline residue.

*Example 3.—2,2,2-tribromo-1-cyanoethyl 4-chlorobenzoate*

One-half mole (140.5 grams) of bromal was dissolved in 200 milliliters of chloroform and one-half mole (87.5 grams) of 4-chlorobenzoyl chloride added portionwise thereto over a period of 10 minutes with stirring and at a temperature of −15° C. 24.5 grams (0.5 mole) of sodium cyanide dissolved in 50 milliliters of water was then added portionwise to the above mixture with stirring and over a period of 40 minutes. The addition was carried out at a temperature of −10° C. and the mixture thereafter maintained for one hour at a temperature below 0° C. to complete the reaction. The reaction mixture was then warmed to room temperature, the aqueous layer separated from the organic layer and the latter successively washed with water and 5 percent aqueous sodium carbonate. Following removal of the solvent by evaporation, a 2,2,2-tribromo-1-cyanoethyl 4-chlorobenzoate product was obtained as a crystalline residue. The latter product was successively recrystallized from methanol and a petroleum ether boiling at from 60° to 70° C. and found to melt at 137°–138° C. and have a chlorine content of 8.03 percent, and have a bromine content of 52.44 percent.

*Example 4.—2,2-dichloro-1-cyanoethyl 4-chlorobenzoate*

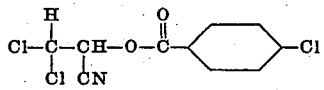

One-half mole (56.9 grams) of dichloroacetaldehyde was dissolved in 300 milliliters of chloroform and one-half mole (87.5 grams) of 4-chlorobenzoyl chloride added rapidly thereto with stirring and at a temperature of −10° C. One-half mole (24.5 grams) of sodium cyanide dissolved in 100 milliliters of water was then added portionwise with stirring to the above mixture and over a period of 30 minutes. The addition was carried out with cooling and at a temperature of −10° C. Following the addition, the temperature was maintained at about 0° C. for about one-half hour to complete the reaction. The reaction mixture was then allowed to come to room temperature, the aqueous layer separated from the organic layer and the latter successively washed with 5 percent aqueous sodium carbonate and water. Following removal of the solvent by evaporation, a 2,2-dichloro-1-cyanoethyl 4-chlorobenzoate product was obtained as a crystalline residue. The latter was successively recrystallized from methanol and found to melt at 107°–108° C and have a chlorine content of 36.62 percent and a nitrogen content of 5.03 percent.

*Example 5.—2,2,2-tricholoro-1-cyanoethyl 2,4-dichlorobenzoate*

One-half mole of chloral was dissolved in 500 milliliters of chloroform and 0.51 mole (107.73 grams) of 2,4-dicholorbenzoyl chloride added portionwise thereto with stirring over a period of 10 minutes. One-half mole of sodium cyanide dissolved in 150 milliliters of water was then added portionwise to the above mixture with stirring and over a period of 30 minutes. The addition was carried out with cooling and at a temperature of 0° C. Following the addition, the mixture was stirred for one hour at 0° C. and the temperature thereafter allowed to rise to room temperature. The aqueous layer was then separated from the organic layer and the latter successively washed with dilute aqueous sodium carbonate and water. The solvent was then recovered by fractional distillation under reduced pressure to obtain a 2,2,2-trichloro-1-cyanoethyl 2,4-dichlorobenzoate product as a crystalline residue. The latter was successively recrystallized from methanol and found to melt at 79°–80° C. and have a chlorine content of 50.23 percent and a nitrogen content of 4.08 percent.

*Example 6.—2,2,2-trichloro-1-cyanoethyl 3-bromobenzoate*

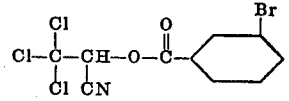

Two moles of chloral hydrate was dissolved in 200 milliliters of chloroform and 0.2 mole of 3-bromobenzoyl chloride dissolved in 50 milliliters of chloroform added rapidly thereto with stirring. The above mixture was then cooled to from 0° to 5° C. and 0.3 mole of sodium cyanide dissolved in 50 milliliters of water added slowly thereto with stirring and cooling. The addition was carried out over a period of about 30 minutes and the mixture thereafter stirred for one hour at 5° C. to complete the reaction. The temperature of the mixture was then allowed to rise to room temperature, the aqueous layer separated from the organic layer and the latter successively washed with dilute aqueous sodium carbonate and water. Following the removal of the solvent by fractional distillation under reduced pressure, a 2,2,2-trichloro-1-cyanoethyl 3-bromobenzoate product was obtained as a light yellow liquid residue.

*Example 7.—2,2,2-trichloro-1-cyanoethyl 4-nitrobenzoate*

0.1 mole quantities of chloral cyanohydrin and 4-nitrobenzoyl chloride were mixed together and slowly warmed with stirring to 170° C. Stirring was thereafter continued and the reaction mixture maintained at from 170° to 180° C. for 2 hours and until the evolution of hydrogen chloride of reaction was substantially complete. The reaction mixture was then cooled to room temperature, dissolved in chloroform and the chloroform solution successively washed at 60° C. with dilute aqueous sodium carbonate and water. Following removal of the solvent by fractional distillation under reduced pressure, a 2,2,2-trichloro-1-cyanoethyl 4-nitrobenzoate product was obtained as a crystalline residue. The latter was recrystallized from ethanol and found to melt at 99°–100° C. and have a chlorine content of 32.72 percent.

*Example 8.—2,2,2-trichloro-1-cyanoethyl 4-nitrobenzoate*

42 grams (0.25 mole) of chloral hydrate dissolved in 500 milliliters of ether was mixed with 46 grams (0.25 mole) of 4-nitrobenzoyl chloride dissolved in 500 milliliters of ether and 25 grams (0.25 mole) of sodium cyanide dissolved in 100 milliliters of water added portionwise thereto with stirring. The addition was carried out over a period of 30 minutes and at a temperature of 10° C. Stirring was thereafter continued at the same temperature for one hour to complete the reaction. The aqueous layer was then separated from the ether layer and the latter washed with water. Following evaporation of the solvent, a 2,2,2-trichloro-1-cyanoethyl 4-nitrobenzoate product was obtained as a crystalline residue. The latter was recrystallized from isopropanol and found to melt at 99°–100° C.

*Example 9.—2-chloro-1-cyanoethyl 4-chlorobenzoate*

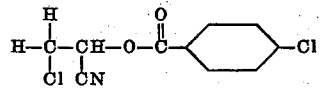

17.5 grams (0.1 mole) of 4-chlorobenzoyl chloride, dissolved in 100 milliliters of chlorobenzene was added to 10.5 grams (0.1 mole) of chloroacetaldehyde cyanohydrin and the resulting mixture heated at the boiling temperature and under reflux until the evolution of hydrogen chloride of reaction was substantially complete. The heating was carried out over a period of 5 hours and at a temperature of from 134° to 136° C. Following the heating operation, the mixture was cooled to room temperature, and successively washed with water and dilute aqueous sodium carbonate and dried with anhydrous calcium sulfate. The dried mixture was then fractionally distilled under reduced pressure at temperatures gradually increasing up to a temperature of 60° C. to recover the solvent and thereafter set aside at room temperature for 16 hours. During the latter period a 2-chloro-1-cyanoethyl 4-chlorobenzoate product precipitated in the mixture as a crystalline solid. The latter was separated by filtration, recrystallized from isopropanol and found to melt at 59°-60° C.

In a similar manner, other substituted benzoates may be prepared of which the following are representative.

2,2-dibromo-1-cyanoethyl 2-nitrobenzoate by reacting together dibromoacetaldehyde cyanohydrin and 2-nitrobenzoyl chloride.

2-bromo-1-cyanoethyl 2,4-dinitrobenzoate by reacting together bromoacetaldehyde cyanohydrin and 2,4-dinitrobenzoyl bromide.

2,2,2-trichloro-1-cyanoethyl 2,4,5-trichlorobenzoate by reacting together chloral hydrate, 2,4,5-trichlorobenzoyl chloride, potassium cyanide and water.

2-chloro-1-cyanoethyl 2,4,6-tribromobenzoate by reacting together chloroacetaldehyde cyanohydrin and 2,4,6-trichlorobenzoyl bromide.

2,2-dibromo-1-cyanoethyl 2,4-dibromobenzoate by reacting together dibromoacetaldehyde, 2,4-dibromobenzoyl chloride, potassium cyanide and water.

2,2,2-tribromo-1-cyanoethyl 4-nitrobenzoate by reacting together bromal, 4-nitrobenzoyl bromide, sodium cyanide and water.

2,2,2-trichloro-1-cyanoethyl 2-bromo-4-chlorobenzoate by reacting together bromal cyanohydrin and 2-bromo-4-chlorobenzoyl bromide.

I claim:

1. A substituted benzoate of the formula

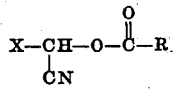

wherein X represents a member of the group consisting of the chloromethyl and bromomethyl radicals and R represents a member of the group consisting of the chlorophenyl, bromophenyl and nitrophenyl radicals.

2. 2,2,2-trichloro-1-cyanoethyl 4-chlorobenzoate.
3. 2,2,2-tribromo-1-cyanoethyl 4-chlorobenzoate.
4. 2,2-dichloro-1-cyanoethyl 4-chlorobenzoate.
5. 2,2,2-trichloro-1-cyanoethyl 4-nitrobenzoate.
6. 2,2,2-trichloro-1-cyanoethyl 2,4-dichlorobenzoate.

References Cited in the file of this patent

UNITED STATES PATENTS

| | | |
|---|---|---|
| 2,259,167 | Kung | Oct. 14, 1941 |
| 2,311,898 | Lichty | Feb. 23, 1943 |
| 2,394,520 | Lichty | Feb. 5, 1946 |

OTHER REFERENCES

Woodburn et al., J. A. C. S., vol. 71, 1709-10 (1949).